(12) United States Patent
Nicks et al.

(10) Patent No.: US 11,847,634 B2
(45) Date of Patent: Dec. 19, 2023

(54) SYSTEMS AND METHODS FOR CONDITIONALLY GIFTING FUNDS

(71) Applicants: Jacob James Nicks, Naples, FL (US); David Steven Sargent, Chicago, IL (US)

(72) Inventors: Jacob James Nicks, Naples, FL (US); David Steven Sargent, Chicago, IL (US)

( * ) Notice: Subject to any disclaimer, the term of this patent is extended or adjusted under 35 U.S.C. 154(b) by 0 days.

(21) Appl. No.: 17/162,522

(22) Filed: Jan. 29, 2021

(65) Prior Publication Data

US 2021/0241260 A1  Aug. 5, 2021

Related U.S. Application Data

(60) Provisional application No. 62/967,689, filed on Jan. 30, 2020.

(51) Int. Cl.
*G06Q 20/34* (2012.01)
*G06Q 20/40* (2012.01)

(52) U.S. Cl.
CPC ......... *G06Q 20/354* (2013.01); *G06Q 20/342* (2013.01); *G06Q 20/355* (2013.01); *G06Q 20/4015* (2020.05)

(58) Field of Classification Search
CPC .. G06Q 20/354; G06Q 20/415; G06Q 20/342; G06Q 20/355
USPC ........................................................ 705/44
See application file for complete search history.

(56) References Cited

U.S. PATENT DOCUMENTS

| | | | | |
|---|---|---|---|---|
| 8,544,734 B1* | 10/2013 | Stafford | ................. | G06Q 30/06 |
| | | | | 235/487 |
| 10,846,685 B2* | 11/2020 | Milner | ................. | G06Q 20/342 |
| 2005/0127169 A1* | 6/2005 | Foss | ..................... | G07F 7/1008 |
| | | | | 235/380 |
| 2009/0055317 A1* | 2/2009 | Andalib | ............. | G06Q 30/0224 |
| | | | | 705/41 |
| 2009/0307118 A1* | 12/2009 | Baumgartner, IV | ........................ | |
| | | | | G06Q 20/354 |
| | | | | 705/41 |
| 2012/0166314 A1* | 6/2012 | Kimberg | .............. | G06Q 20/352 |
| | | | | 705/26.1 |
| 2014/0040118 A1* | 2/2014 | Miller | ................. | G06Q 20/351 |
| | | | | 705/35 |

(Continued)

FOREIGN PATENT DOCUMENTS

| | | | | |
|---|---|---|---|---|
| CA | 2786264 A1 * | 7/2011 | ......... | G06Q 20/0655 |
| CA | 2767500 A1 * | 4/2012 | ............. | G06Q 20/20 |

(Continued)

OTHER PUBLICATIONS

"Gift cards: a review and research agenda," by Daniel Horne and Neil Bendle. The international review of retail, distribution and consumer research. 26.2 (2016) Abstract (Year: 2016).*

*Primary Examiner* — Sara C Hamilton
(74) *Attorney, Agent, or Firm* — McAndrews, Held & Malloy, Ltd.

(57) ABSTRACT

Described herein are examples of gift card management systems that provide gift cards that must be activated prior to being used in a transaction. In some examples, a purchaser may be refunded some or all of a purchase price for the gift card when the gift card is not activated. In some examples, the activation may additionally include certain safeguards to prevent fraud.

20 Claims, 10 Drawing Sheets

(56) References Cited

U.S. PATENT DOCUMENTS

| | | | | |
|---|---|---|---|---|
| 2014/0061299 A1* | 3/2014 | Scipioni | ............... | G06Q 20/347 235/380 |
| 2014/0081856 A1* | 3/2014 | Blackhurst | ........... | G06Q 20/387 705/41 |
| 2014/0214567 A1* | 7/2014 | Llach | ................. | G06Q 30/0207 705/17 |
| 2014/0244464 A1* | 8/2014 | Pinski | .................. | G06Q 20/321 705/35 |
| 2014/0330660 A1* | 11/2014 | Glass | .................. | G06Q 20/354 705/21 |
| 2015/0206134 A1* | 7/2015 | Rodning | ............. | G06Q 20/342 705/41 |
| 2015/0332252 A1* | 11/2015 | Shahrokhi | .......... | G06Q 20/3278 705/41 |
| 2017/0046679 A1* | 2/2017 | Gotlieb | .................. | G06Q 20/34 |
| 2018/0165675 A1 | 6/2018 | Isaacson et al. | | |
| 2020/0034825 A1* | 1/2020 | Levy | .................... | G06Q 20/354 |
| 2020/0074445 A1* | 3/2020 | Isaacson | ................ | G06Q 20/10 |
| 2021/0065161 A1* | 3/2021 | Hoar | .................... | G06Q 20/387 |

FOREIGN PATENT DOCUMENTS

| | | | | | |
|---|---|---|---|---|---|
| CA | 2980946 C | * | 4/2019 | ............ | G06Q 20/00 |
| PH | 12016000051 A1 | * | 8/2016 | | |
| WO | WO-9963744 A1 | * | 12/1999 | ............ | G06Q 20/28 |

* cited by examiner

US 11,847,634 B2

SYSTEMS AND METHODS FOR CONDITIONALLY GIFTING FUNDS

CROSS REFERENCE TO RELATED APPLICATIONS

This application claims priority to, and the benefit of, U.S. Provisional Patent Application No. 62/967,689, filed Jan. 30, 2020, entitled "SYSTEM AND METHOD FOR ISSUING GIFT CARDS WITH CONDITIONAL FUNDING," the entire contents of which being hereby incorporated by reference.

TECHNICAL FIELD

The present disclosure generally relates to the gifting of funds and, more particularly, to conditionally gifting funds.

BACKGROUND

Gift cards are sometimes given as presents, awards, or bonuses. However, the gift cards are often never used, or only partially used. Conventionally, there is no way for the gift card giver to know whether the gift card funds are ever used. If unused, the gifted funds conventionally simply become a windfall to the gift card seller.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to conditionally gifting funds, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

BRIEF DESCRIPTION OF THE DRAWINGS

The figures are not necessarily to scale. Where appropriate, the same or similar reference numerals are used in the figures to refer to similar or identical elements.

DETAILED DESCRIPTION

Figure 1:
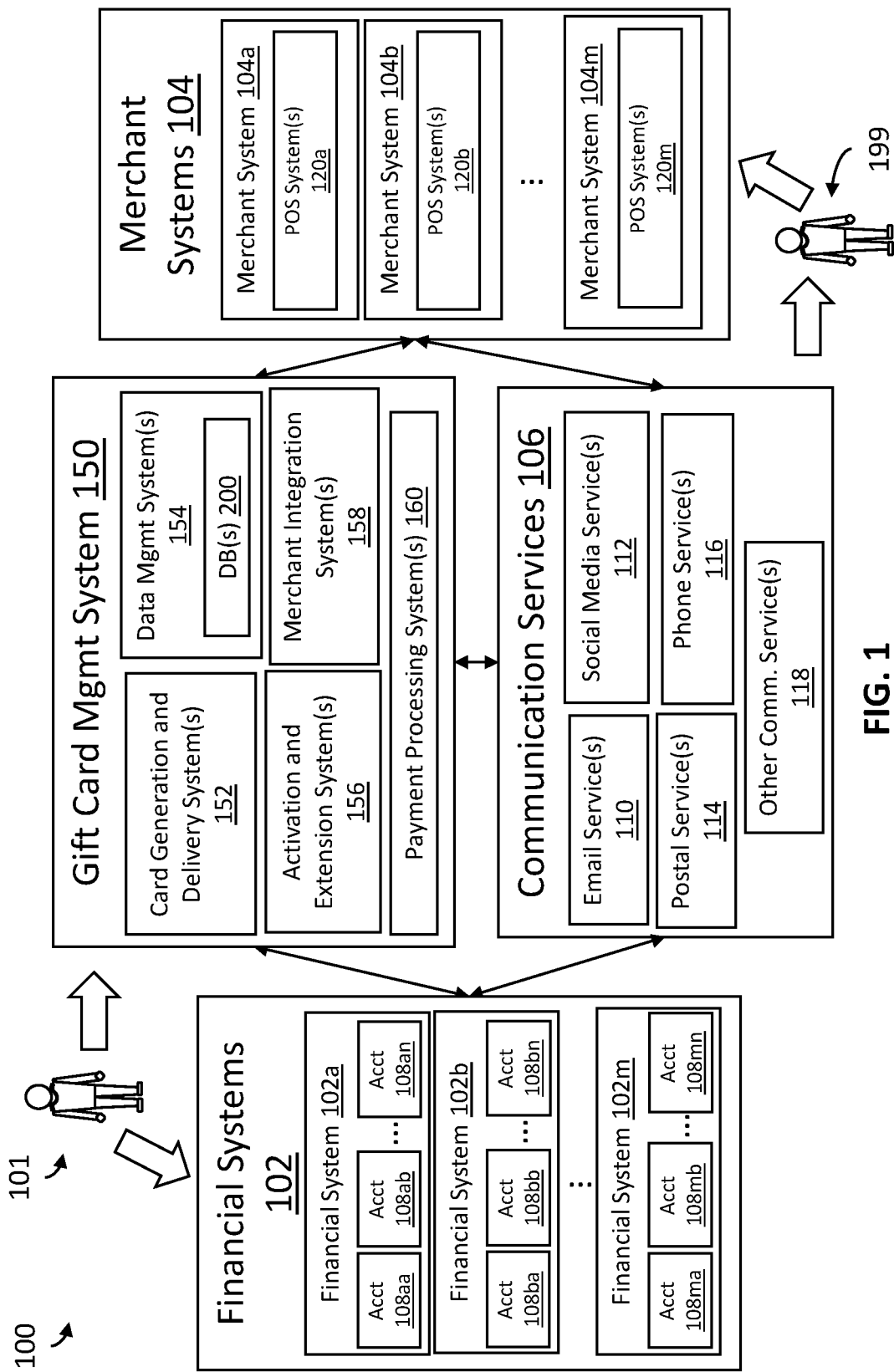
FIG. 1 is a block diagram showing an example gift card processing system, in accordance with aspects of this disclosure.

There are typically two types of gift cards: open loop and closed loop. Open loop gift cards can be used almost anywhere, like debit cards. Closed loop gift cards, on the other hand, can only be used with a particular merchant (e.g., a Starbucks gift card). While open loop gift cards are more versatile, they also typically require the involvement of a bank or other financial institution, which can be a non-trivial complication for a gift card provider/manager. Closed loop gift cards are generally easier for a gift card provider/manager and/or merchant to implement, and are a tried and true way for a merchant to drive up sales and bring in new customers.

However, consumers can be turned off by the potential for gift card funds to go to waste. This may be especially true for closed loop gift cards, since there is no potential for the funds to be used with a different merchant. Consumers may also be discouraged from purchasing and/or using gift cards if they have to expend time to create an account or give up their anonymity by entering personal information.

Some examples of the present disclosure relate to gift card management systems that provide gift cards that must be activated (e.g., via a non-purchasing process) prior to being used to make a purchase. In some examples, the activation process may acquire some personal characteristics of a gift card recipient, which may eliminate the need for the recipient to create an account and/or enter what might be perceived as personal information. In some examples, the activation may additionally include certain safeguards to prevent fraud. In some examples, a refund may be provided when the gift card is not activated prior to an activation deadline. Separate activation and expiration deadlines may also help to workaround certain legislation that prohibits (and/or imposes stringent requirements upon) expiration dates for gift cards.

Some examples of the present disclosure relate to a method of conditionally gifting funds, comprising: issuing a gift card having a card identifier; associating the card identifier with an activation deadline in memory circuitry; determining, via processing circuitry, whether the activation deadline has passed; and in response to activating the gift card via a non-purchasing process and determining, via the processing circuitry, that the activation deadline has not passed, initiating, via communication circuitry, a transfer of funds from a first account to a second account of a financial system.

In some examples, the first account is a holding account or associated with a purchaser of the gift card. In some examples, the method further comprises initiating, via communication circuitry, a transfer of funds from a third account to the first account in response to a purchase of the gift card or a purchase of a marketing service; and initiating, via communication circuitry, a return of the funds to the third account in response to determining, via the processing circuitry, that the activation deadline has passed, wherein the third account is associated with a purchaser of the gift card, and the first account is a holding account. In some examples, activating the gift card comprises collecting one or more personal characteristics of a recipient of the gift card according to one or more activation requirements set forth in a database.

In some examples, the one or more personal characteristics comprise contact information. In some examples, the contact information comprises a residential address, a business address, an email address, a phone number, a social media account, or a gaming account. In some examples, activating the gift card comprises identifying an activation area associated with a request to activate the gift card; determining, via the processing circuitry, whether the activation area is within a predetermined geographic area; in response to determining the activation area is not within the predetermined geographic area, declining the activation, via the processing circuitry; and in response to determining the activation area is within the predetermined geographic area, activating the gift card, via the processing circuitry.

In some examples, the method further comprises transmitting, via the communication circuitry, a signal in response to determining that the activation deadline has passed, the signal being indicative of an offer to extend the activation deadline; and extending, via the processing circuitry, the activation deadline in response to receiving a second signal indicating acceptance of the offer. In some examples, the offer is contingent upon successful completion of an activity. In some examples, the gift card is a closed loop gift card.

Some examples of the present disclosure relate to a system for conditionally gifting funds, comprising: a gift card database that associates a card identifier with an activation deadline and one or more activation requirements of a non-purchasing activation process; a computing system comprising: processing circuitry; and memory circuitry comprising machine readable instructions which, when executed by the processing circuitry, cause the processing circuitry to: receive one or more signals representative of an attempted activation of a gift card, the gift card being associated with the card identifier; determine whether the attempted activation satisfies the one or more activation requirements, determine whether the attempted activation occurred prior to the activation deadline, and activate the gift card in response to determining the attempted activation comprises the non-purchasing activation process, satisfies the one or more activation requirements, and occurred prior to the activation deadline, and initiate a transfer funds from a first account to a second account in response to activating the gift card.

In some examples, the computing system further comprises communication circuitry, the one or more signals received via the communication circuitry. In some examples, the computing system further comprises communication circuitry in communication with an electronic or radio frequency (RF) communication network, wherein activating the gift card or transferring funds comprises communicating with a financial system over the electronic or RF communication network via the communication circuitry. In some examples, the memory circuitry comprises machine readable instructions which, when executed by the processing circuitry, further cause the processing circuitry to: initiate a transfer of funds from a third account to the first account in response to a purchase of the gift card via communication with the banking system via the communication circuitry, and return the funds to the third account in response to determining the activation deadline has passed, wherein the third account is associated with a purchaser of the gift card, and the first account is a holding account.

In some examples, activating the gift card comprises collecting of one or more personal characteristics of a recipient of the gift card. In some examples, the one or more personal characteristics comprise contact information. In some examples, the contact information comprises a residential address, a business address, an email address, a phone number, a social media account, or a gaming account.

In some examples, the memory circuitry comprises machine readable instructions which, when executed by the processing circuitry, further case the processing circuitry to identify an activation area associated with a request to activate the gift card, determine whether the activation area is within a predetermined geographic area associated with the card identifier in the gift card database, in response to determining the activation area is not within the predetermined geographic area, decline the activation, and in response to determining the activation area is within the predetermined geographic area, activate the gift card. In some examples, the computing system further comprises communication circuitry, and the memory circuitry comprises machine readable instructions which, when executed by the processing circuitry, further case the processing circuitry to transmit, via the communication circuitry, a first signal in response to determining that the activation deadline has passed, the first signal being indicative of an offer to extend the activation deadline; and extend the activation deadline in response to receiving, via the communication circuitry, a second signal indicating acceptance of the offer. In some examples, the offer is contingent upon successful completion of an activity.

FIG. 1 is a diagram showing an example gift card processing system 100. As shown, the gift card processing system 100 includes a gift card management system 150 in communication and/or cooperation with one or more financial systems 102, one or more merchant systems 104, and/or one or more communication services 106. In some examples, communication and/or cooperation among and/or between the gift card management system 150, merchant system(s) 104, financial system 102, and/or communication service(s) 106 may be conducted over one or more communication networks (e.g., Local Area Networks, Wide Area Networks, telephone communication networks, etc.) and/or via one or more (e.g., electronic and/or radio frequency) communication signals.

Figure 5:
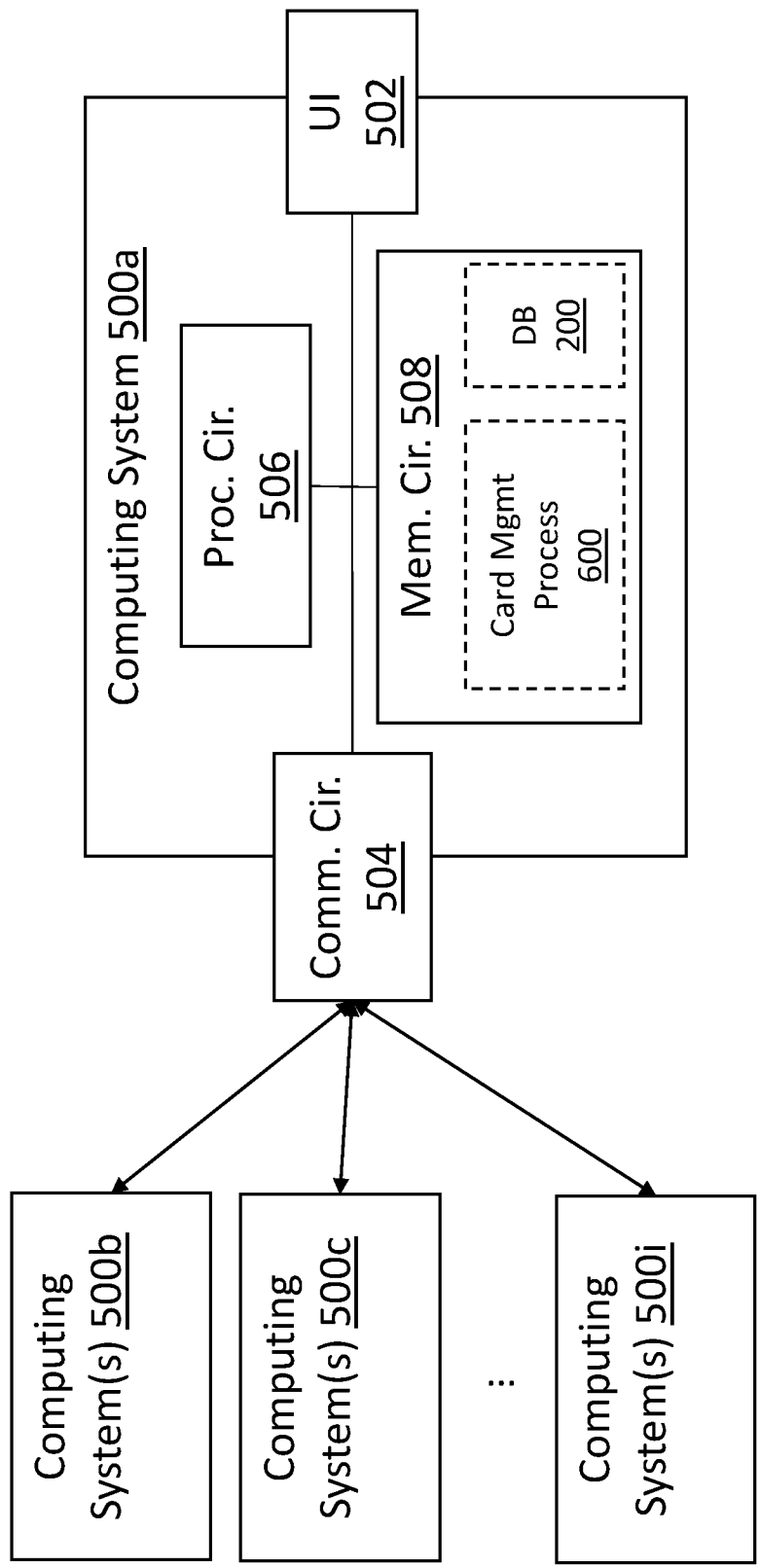
FIG. 5 is a diagram showing an example computing system that may be used to implement an example gift card management system used in the gift card processing system of FIG. 1, in accordance with aspects of this disclosure.

In the example of FIG. 1, the gift card management system 150 includes one or more card generation and delivery subsystems 152, data management subsystems 154, activation and extension subsystems 156, merchant integration subsystems 158, and payment processing subsystems 160. As shown, the data management subsystems 154 includes one or more databases 200, as further discussed below with respect to FIG. 2. In some examples, the gift card management system 150 (and/or the financial system(s) 102, merchant system(s) 104, and/or communication service(s) 106) and/or its various subsystems may include and/or be implemented via one or more computing systems (e.g., such as shown in FIG. 5), web servers, distributed systems, manufacturing facilities, online and/or brick and mortar storefronts, and/or other appropriate devices, services, and/or operations.

In some examples, the gift card management system 150 may transact with one or more purchasers 101 for gift cards 300 and/or other (e.g., marketing) services. For example, a purchaser 101 may purchase one or more open or closed loop gift cards 300 to give out as presents, awards, bonuses, and/or other purposes. As another example, a purchaser 101 may purchase marketing services, through which a certain number of leads may be identified, and the gift card management system 150 may identify the leads via delivery of one or more gift card 300.

In some examples, the payment processing subsystem(s) 160 may process payment(s) made by the purchaser(s) 101 (and/or other financial transactions). For example, the payment processing subsystem(s) 160 may initiate one or more fund transfers from one or more accounts 108 associated with the purchaser(s) 101 to one or more holding accounts 108 (e.g., associated with the financial system 102, a holding company, or some third party) and/or one or more accounts 108 associated with the gift card management system 150. In some examples, using holding account(s) 108 may ensure that the funds remain available and are not used for other purposes or withdrawn. In some examples, some or all of the funds may remain in the holding account(s) 108 until some or all of the gift card(s) 300 are activated, the lead(s) are identified, or some deadline has passed. In some examples, temporary test withdrawals may be made from the account(s) 108 associated with the purchaser(s) 101 to ensure that the appropriate funds are available instead of using the holding account(s) 108. In some examples, the payment(s) by the purchaser(s) 101 may be directly proportional to the number of gift card(s) 300 and/or leads purchased.

In some examples, the card generation and delivery subsystem(s) 152 may handle the creation, procurement, and/or delivery of new gift cards 300, such as, for example, in response to (or simultaneously with) a transaction with a purchaser 101 via the payment processing subsystem(s) 160. In some examples, generation of a gift card 300 may comprise manufacture and/or procurement of a physical card with a printed and/or encoded (e.g., with a barcode and/or magnetic stripe) card identifier. In some examples, generation of a gift card 300 may comprise generation of an electronic and/or digital virtual card. In some examples, a "virtual" card may comprise a simple (e.g., alphanumeric) card identifier. In some examples, a "virtual" card may comprise a more complicated digital object representative of a traditional physical card (along with card identifier).

Whether physical or virtual, the card generation and delivery subsystem(s) 152 may generate card data for the gift card 300 and cooperate with the data management subsystem(s) 154 to store the card data (e.g., in database(s) 200 and/or memory circuitry 508). In some examples, card data may include a card identifier that is uniquely associated with the gift card 300, so that one particular gift card 300 may be uniquely identified and/or distinguished from other gift cards 300. In examples where the gift card 300 is procured rather than directly generated or manufactured, the card identifier may have already been generated, and the card generation and delivery subsystem(s) 152 may instead simply use the previously generated card identifier and/or indicate (e.g., in the data management subsystem(s) 154 and/or database(s) 200) that the gift card 300 associated with the card identifier is being used and/or delivered.

Figure 2:
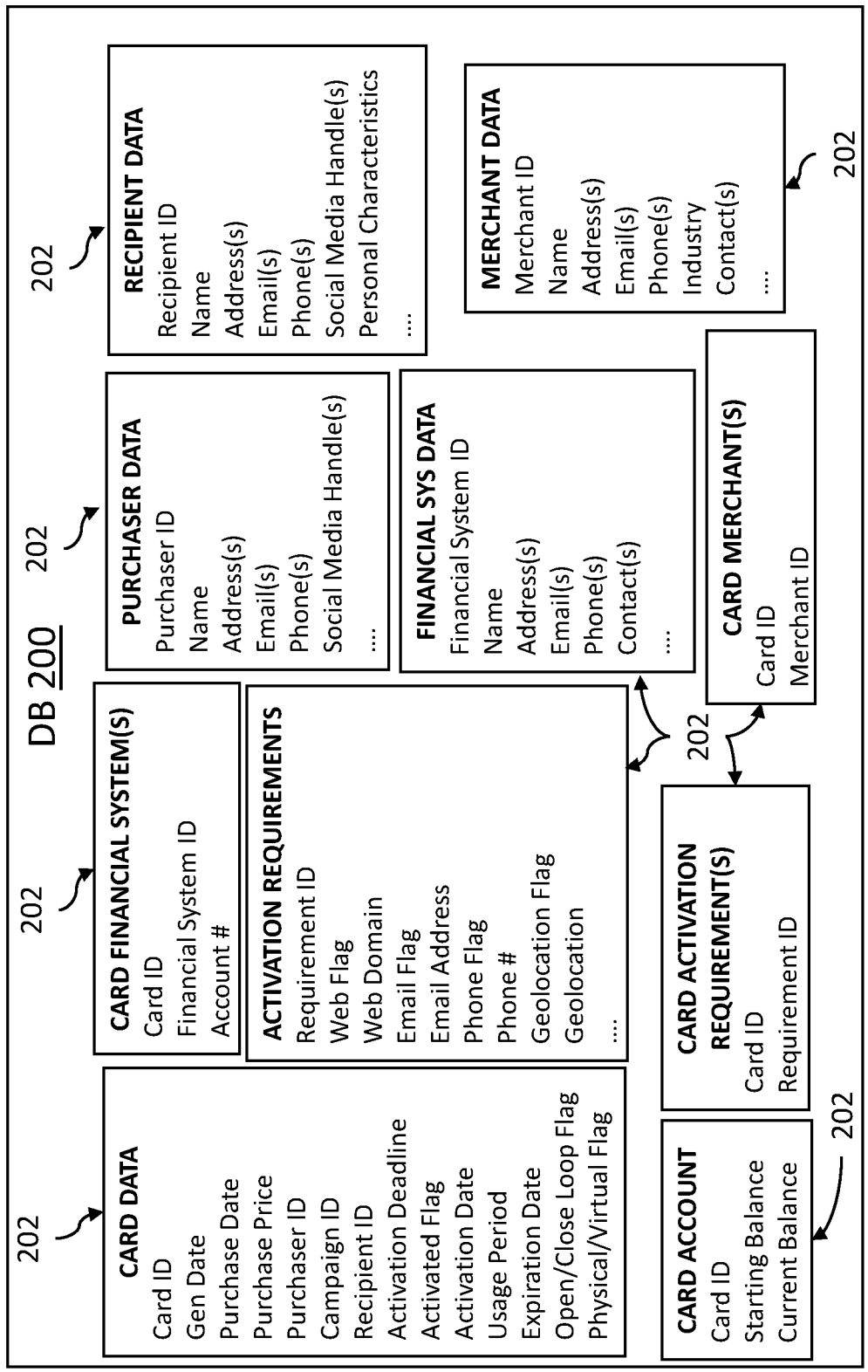
FIG. 2 is a diagram illustrating an example database that may be used in the gift card processing system of FIG. 1, in accordance with aspects of this disclosure.

FIG. 2 is a diagram showing an example design of a database 200 that may be used by the data management subsystem(s) 154. While one database 200 is shown in the example of FIG. 2 for the sake of simplicity, in some examples, the data management subsystem(s) 154 may include several databases 200. While the database 200 is depicted as a relational database 200, in some examples, one or more other types of databases 200 may be used. While some example tables 202 are shown in the example of FIG. 2 as belonging to the database 200, in some examples, the tables 202 may be spread across several databases 200. In some examples, more or fewer tables 202 (and/or columns of the tables 202) may be used.

In the example of FIG. 2, the database 200 includes a card data table 202. As shown, the card data table 202 includes columns/fields for a card identifier, a generation date, a purchase date (which may, in some examples, be the same as the generation date), a purchase price, a purchaser identifier, a campaign identifier, a recipient identifier, an activation deadline, an activated flag, a usage period, an expiration date, an open/close loop flag, and a physical/virtual flag. In some examples, the activated flag, open/close loop flag, and/or physical/virtual flag columns/fields may hold Boolean values that identify whether the gift card 300 has been activated, the gift card 300 is an open or closed loop gift card 300 (e.g., with true/false corresponding to open/closed or vice versa), and/or the gift card 300 is a physical or virtual gift card 300 (e.g., with true/false corresponding to physical/virtual or vice versa).

In some examples, the activation deadline may be a date by which the gift card 300 must be activated in order to be used. In some examples, the expiration date may be a date after which the gift card 300 may no longer be used. In some examples, the expiration date may be dependent upon the activation date and/or the usage period. For example, the expiration date may be set to the end of a usage period that begins at the activation date.

In the examples of FIG. 2 there are other tables 202 that may be related to and/or associated with the card data table 202 (and/or one or more of the columns of the card data table 202) through one or more similar columns. For example, the card account, card activation requirements, card merchants, and card financial systems tables 202 may all be related to the card data table 202 via the card identifier column. In some examples where the gift card 300 is a closed loop card, the card merchants table 202 may identify the merchant(s) with which the gift card 300 may be used.

In some examples, the cards account table 202 may be used (e.g., together with the merchant integration subsystem(s) 158 and/or merchant systems 104) to keep track of a remaining account balance associated with the gift card 300. In some examples where the gift card 300 is an open loop card, the card financial systems table 202 may identify the account(s) 108 and/or financial system(s) 102 associated with the gift card 300. In some examples, the gift card management system 150 may be able to obtain information about the remaining balance of the gift card 300 from the identified financial system(s) 102. While not shown, in some examples, the database(s) 200 may include one or more tables 202 that store information regarding a usage/transaction history of a gift card 300.

In the example of FIG. 2, the database 200 also includes purchaser, recipient, financial system, and merchant data tables 202. In some examples, these data tables 202 may be related and/or associated with the card data table 202 via purchaser, recipient, financial system, and/or merchant identifiers, respectively. In some examples, the tables 202 may store details for each purchaser 101, recipient 199, financial system 102, and/or merchant system 104 with which the gift card management system 150 has interacted. While certain columns are shown as part of these tables 202 as examples of what sort of detail might be stored, in some examples, any number of different and/or additional details may also be stored. While not shown in the example of FIG. 2, in some examples, the database 200 may additionally include a campaign data table 202 (related to the card data table 202 through a campaign identifier column) that stores details relating to marketing campaigns conducted by the gift card management system 150.

In the example of FIG. 2, the database 200 also includes an activation requirements table 202. As shown, the activation requirements table 202 is related to and/or associated with the card data table 202 through a requirement identifier column and a card activation requirement(s) table 202. In some examples, the activation requirements table 202 may associate certain activities a recipient 199 must perform and/or requirements that a recipient 199 must meet in order to activate a gift card 300.

For example, activation might require completion of a survey and/or questionnaire. In some examples, such surveys and/or questionnaires may capture personal characteristics of a recipient 199 (e.g., favorite color/movie/food/drink, perception of brands, needed services, most recently used brand/service, etc.). In some examples, the personal characteristics may be contact information of a recipient 199 (e.g., a residential/business/email address, phone number, social media account/handle, gaming account/handle, etc.). As another example, activation might require watching a short video, or participating in an interactive event and/or activity.

In some examples, these activation activities and/or requirements may allow the gift card management system 150 to obtain valuable (yet seemingly innocuous) information about an activating recipient 199 without requiring the recipient 199 to create an account and/or provide what may be perceived as personal or private information. Furthermore, the information may only be provided by recipients 199 that actually activate the gift card 300, which may require and/or use less space in the database(s) 200 than having an account for every potential recipient 199. Additionally, the information collected may be significantly less than would be collected when typically creating an account, further allowing the gift card management system 150 to save on memory storage space needed and/or used.

In the example of FIG. 2, the activation requirements table 202 includes web flag, email flag, and phone flag fields, as well as corresponding fields for a web domain, email address, and phone number. In some examples, the web flag, email flag, and/or phone flag fields may indicate whether activation requires visiting a website, corresponding with an email address, and/or calling a telephone number. In such examples, the web domain, email address, and phone number fields may store the website, email address, and/or telephone number that must be visited, corresponded with, and/or called for activation.

In some examples, the activation and extension subsystem(s) 156 of the gift card management system 150 may host, communicate with, and/or control the listed website, email address, and/or telephone number. This may allow the activation and extension subsystem(s) 156 to conduct the activation process and/or update the database 200 if/when activation is successfully completed. In some examples, alternative and/or additional flags and/or fields may be used, such as, for example, mailing flag/address and/or store flag/address. For example, activation may require mailing via the postal service(s) 114 and/or visiting a merchant in person. In some examples, a website, email address, and/or phone number may still be used even where activation involves traditional mail or an in person visit, with an employee, rather than the recipient 199 themselves, accessing the website, email address, and/or phone number in response to received mail and/or a visit by the recipient 199.

In the example of FIG. 2, the activation requirements table 202 also includes geolocation flag and geolocation fields. In some examples, the geolocation flag and geolocation fields may be used to indicate whether an activation must take place at a certain location and/or within a certain area, and/or specify that location and/or area. While shown as a single field in the example of FIG. 2 for the sake of simplicity, in some examples, geolocation may comprise several fields, so as to, for example, specify a particular location and a radius to define a geographic area. In some examples, requiring a particular geolocation for activation may help to prevent instances of fraud.

In some examples, once the gift card 300 is generated and/or procured, the card generation and delivery subsystem(s) 152 may attempt delivery of the gift card 300. For example, a purchaser 101 may request that one or more gift cards 300 be delivered to one or more recipients 199. In such an example, the purchaser 101 may provide delivery information for the recipient(s) (e.g., a residential mailing address, an electronic mailing address, a social media handle, a phone number, etc.). In some examples, delivery may be attempted via cooperation and/or communication with one or more communication services 106.

As another example, the gift card management system 150 may seek delivery to one or more recipients 199 in order to fulfill a marketing request of the purchaser 101. In such an example, the gift card management system 150 may acquire the delivery information for the recipient(s) 199 from sources other than the purchaser 101 (e.g., previously compiled information in the data management subsystem(s) 154 and/or a third party, etc.). In some examples, the card generation and delivery subsystem(s) 152 may cooperate and/or communicate with the one or more communication services 106 in order to have the gift card(s) 300 delivered to the recipient(s) 199 according to the associated delivery information.

In some examples, the communication services 106 may comprise means for communicating with the appropriate recipient(s) 199, such as to deliver the gift card(s) 300 and/or information pertaining to the gift card 300. In the example of FIG. 1, the communication service(s) 106 include one or more electronic mail services 110, social media services 112, postal services 114, telephone services 116, and/or other communication services 106 (e.g., gaming service(s), etc.). In some examples, the communication services 106 may include and/or be implemented via one or more computing systems, web servers, databases, distributed systems, manufacturing facilities, online and/or brick and mortar storefronts, and/or other appropriate devices, services, and/or operations.

Figure 3:
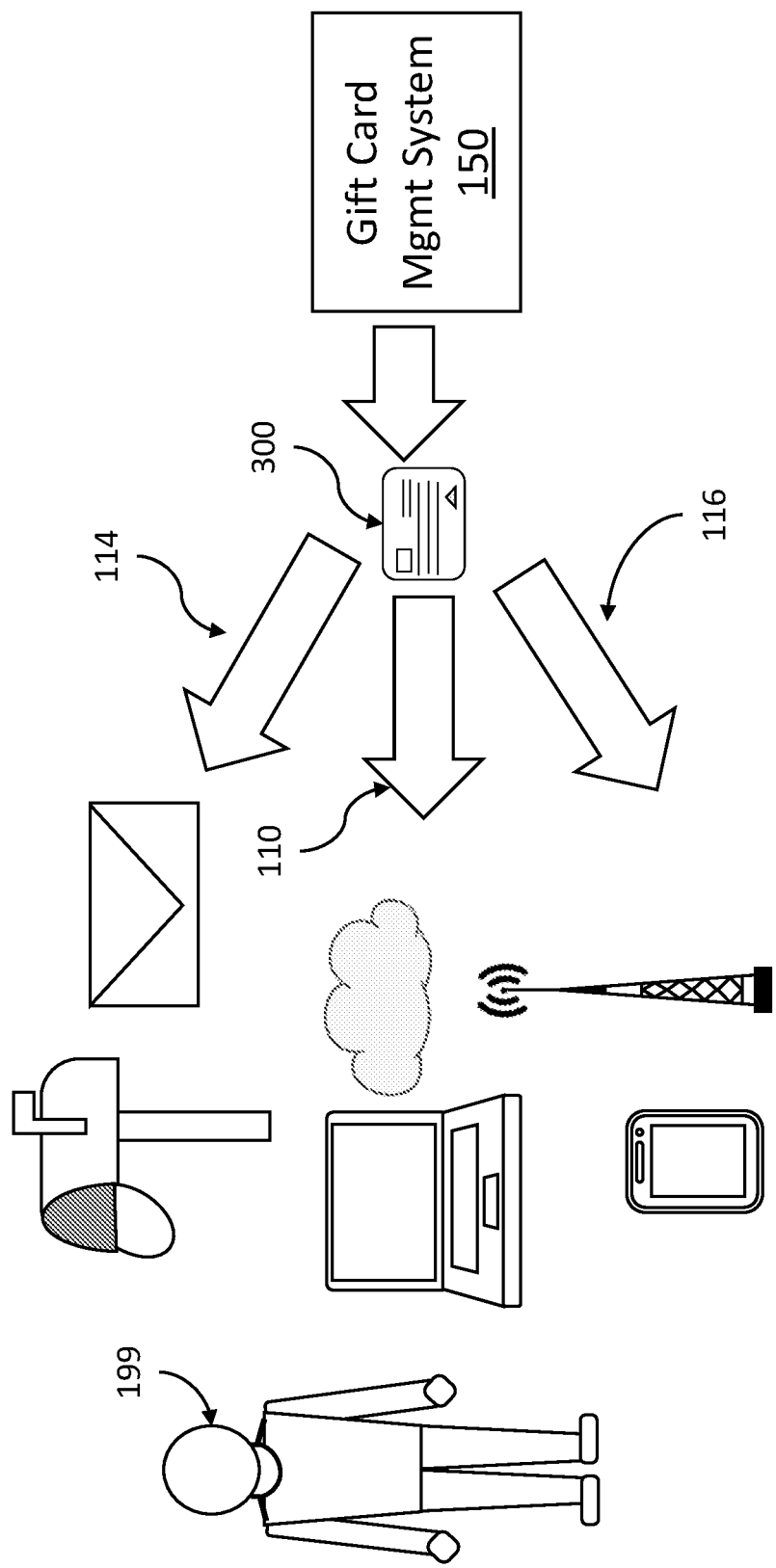
FIG. 3 illustrates example gift card delivery channels, in accordance with aspects of this disclosure.

FIG. 3 is a diagram illustrating delivery of a gift card 300 via postal service 114, electronic mail service 110, and telephone service 116 (e.g., SMS). While the gift card 300 depicted in FIG. 2 is similar to a typical physical gift card 300 for the sake of understanding, in some examples, the gift card 300 may instead be virtual, as discussed above. In some examples, other information may also be delivered along with the gift card 300. Other delivered information may include, for example, activation instructions and/or requirements (e.g., corresponding to the activation requirements stored in the database 200), activation deadline(s), usage period(s), expiration date(s), starting fund balance(s), authorized merchant systems(s) 104 (if closed loop), and/or other pertinent information.

Figure 4:
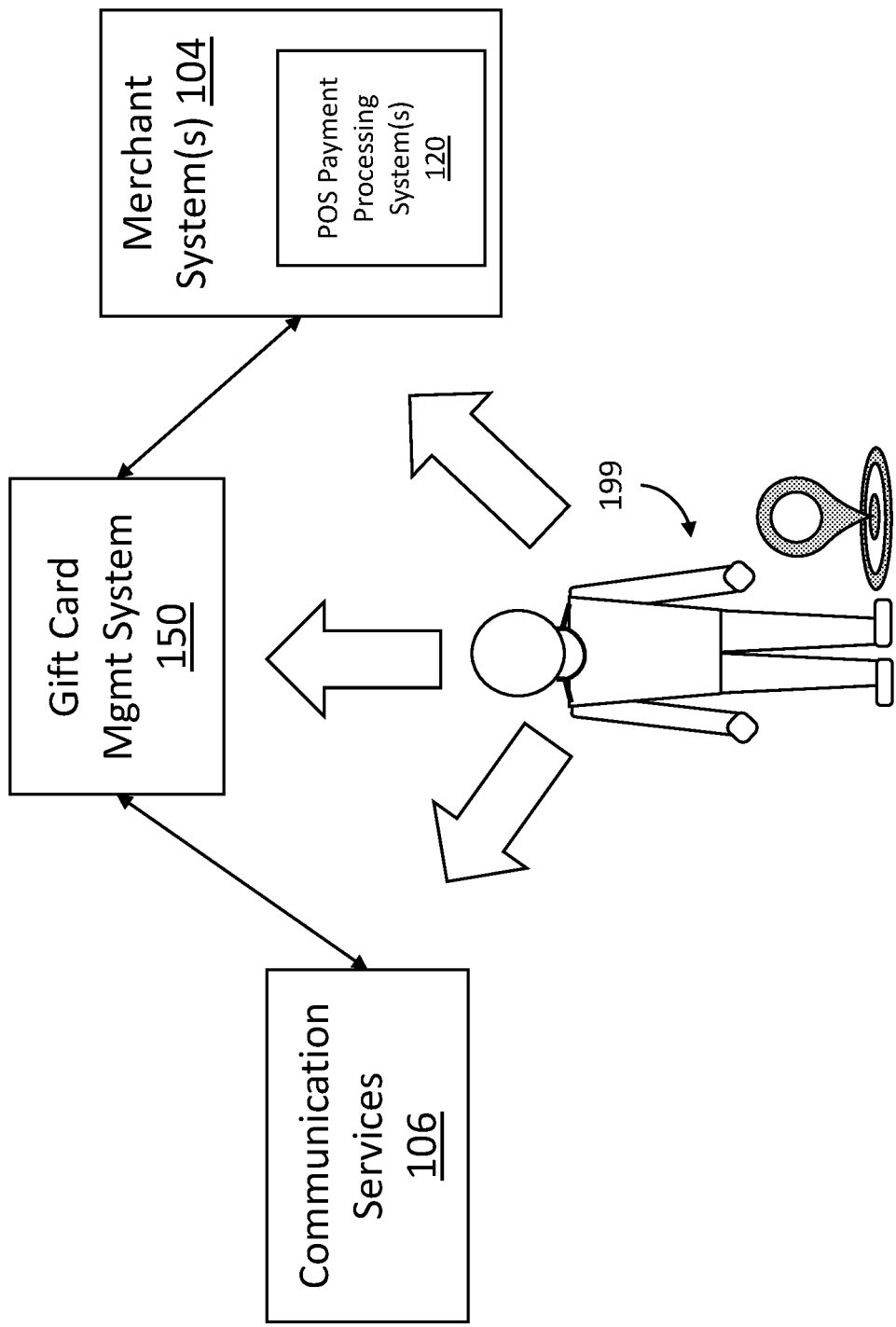
FIG. 4 illustrates example gift card activation channels, in accordance with aspects of this disclosure.

Once the gift card 300 is delivered, the activation and extension subsystem(s) 156 may await activation according to the activation requirements of the gift card 300. FIG. 4 is a diagram illustrating potential channels for activation of the gift card 300. In some examples, activation may occur via channels similar to those used for delivery.

As shown, the recipient may attempt to activate the gift card 300 using the communication service(s) 106 and/or merchant system(s) 104 that are in communication with the gift card management system 150 (and/or its activation and extension subsystem(s) 156). In some examples, the communication service(s) 106 and/or merchant system(s) 104 may communicate an attempted activation that they receive to the gift card management system 150 (and/or its activation and extension subsystem(s) 156). Another option, as shown, is for the recipient to attempt to activate the gift card 300 directly with the gift card management system 150 (and/or its activation and extension subsystem(s) 156).

In some examples, the activation and extension subsystem(s) 156 may evaluate the attempted activation and verify that the attempted activation precedes the activation deadline and meets the activation requirements (e.g., set forth in the database 200). For example, the activation and extension subsystem(s) 156 may detect the location from which the attempted activation is attempted (e.g., via GPS, reverse DNS lookup, etc.) and verify that the location is within a required area (if appropriate). As another example, the activation and extension subsystem(s) 156 may verify that all required survey questions were answered or required information entered.

If the gift card 300 is not successfully activated prior to the activation deadline, the activation and extension subsystem(s) 156 may work with the payment processing subsystem(s) 160 to provide a refund to the purchaser 101 (e.g., where the purchaser 101 bought the gift card 300 rather than marketing services). In some examples, some or all of the purchase price of the gift card 300 may be refunded. In some examples, the payment processing subsystem(s) 160 may communicate and/or cooperate with the appropriate financial system(s) (e.g., via one or more electrical signals) to refund to the account(s) of the purchaser 101. In some examples, the activation and extension subsystem(s) 156 may offer to extend the activation deadline (e.g., if certain conditions are met) in exchange for the recipient 199 completing some additional (e.g., non-purchasing) activity.

In some examples, the activation and extension subsystem(s) 156 may work with the payment processing subsystem(s) 160 to perform a final processing of the purchase payment after successful activation of the gift card 300 (e.g., prior to the activation deadline). For example, the payment processing subsystem(s) 160 may communicate and/or cooperate with the appropriate financial system(s) to move some or all of the funds in the holding account(s) 108 to the account(s) 108 of the gift card management system 150 (and/or the account(s) 108 associated with the gift card 300 itself). In some examples (e.g., with closed loop gift cards 300), funds may be left in the holding account(s) 108 until used to finance transactions with the merchant system(s) 104. In some examples, the activation and extension subsystem(s) 156 may also update the data management subsystem(s) 154 (e.g., the database 200) to indicate successful activation. In some examples, the activation and extension subsystem(s) 156 may also indicate to appropriate the financial system 102 and/or merchant system 104 that the gift card 300 has been activated so that their records may be appropriately updated.

In some examples, the merchant integration subsystem(s) 158 of the gift card management system 150 may be configured for integration with various POS systems 120 of various merchant systems 104. In some examples, the merchant integration subsystem(s) 158 may cooperate and/or communicate with the POS system(s) 120 to process transactions financed by closed loop gift cards 300. For example, the merchant integration subsystem(s) 158 may receive one or more signals from the POS system(s) 120 indicative of the merchant system 104 (e.g., with a merchant identifier), an attempted transaction, a transaction amount, and/or a card identifier of the gift card 300. Using the transmitted transaction information, the merchant integration subsystem(s) 158 may evaluate the attempted transaction and verify (e.g., via the database 200) that the gift card 300 is activated, is authorized for the merchant system 104, and has a fund balance that can accommodate the transaction.

In some examples, the merchant integration subsystem(s) 158 may decide to approve or deny the transaction based on its evaluation. In some examples, the merchant integration subsystem(s) 158 may communicate the decision to the POS system(s) 120. In some examples, the merchant integration subsystem(s) 158 may also update the card account table 202 of the database(s) 200 to reflect a new balance in view of a completed transaction. In some examples, the merchant integration subsystem(s) 158 may also record details of the transaction in the database(s) 200 for future reference.

In some examples, the merchant system(s) 104 may instead keep track of the balance of the gift card 300, and/or process some or all of the gift card 300 transactions internally. However, this may make some portions of the gift card processing system 100 more difficult to accomplish. In some examples, the financial systems 102 may be equipped to process open loop gift cards 300 without intervention of the gift card management system 150.

FIG. 5 is a block diagram illustrating an example computing system 500 that may be used to implement the gift card management system 150. As shown, the computing system 500 includes a user interface (UI) 502, communication circuitry 504, processing circuitry 506, and memory circuitry 508 electrically interconnected with one another through a common electrical bus. While not shown in the example of FIG. 5 for the sake of simplicity, in some examples, the computing system 500 may further include a power source that provides power to the computing system 500.

In some examples, the UI 502 may comprise user accessible inputs and/or outputs. For example, the UI 502 may comprise one or more visual outputs (e.g., touch display screens, video monitors, light emitting diodes, incandescent lights, and/or other lights, etc.) and/or one or more audio outputs (e.g., audio speakers). In some examples, the UI 502 may further comprise one or more inputs (e.g., touch display screens, buttons, knobs, switches, microphones, etc.). In some examples, the UI 502 may comprise one or more input and/or output ports and/or devices (e.g., USB ports, audio ports, HDMI ports, etc.). In some examples, the UI 502 may comprise circuitry configured to drive and/or support the inputs, outputs, ports, and/or devices of the UI 502.

In the example of FIG. 5, the communication circuitry 504 of the computing system 500 is shown in communication with one or more other computing systems 500. In some examples, the communication may be through a network (e.g., a Local Access Network, Wide Area Network, the Internet, etc.). In some examples, the communication may be wireless. In some examples, the communication circuitry 504 may instead communicate over a wired connection. In some examples, the communication circuitry 504 may also be used to communicate with the financial system(s) 102, merchant system(s) 104, and/or communication service(s) 106 when the computing system(s) 500 implement(s) the gift card management system 150.

In some examples, the communication circuitry 504 may be configured to facilitate communication via one or more wired media and/or protocols (e.g., Ethernet cable(s), serial cables, universal serial bus (USB) cable(s), etc.) and/or wireless mediums and/or protocols (e.g., cellular communication, general packet radio service (GPRS), near field communication (NFC), ultra high frequency radio waves (commonly known as Bluetooth), IEEE 802.11x, LTE, and/or other appropriate media and/or protocols). In some examples, the communication circuitry 504 may include one or more wired and/or wireless communication adapters, cards, and/or circuit boards. In some examples, the communication circuitry 504 may include one or more radio frequency (RF) devices, wireless communication devices, Bluetooth devices, IEEE 802.11-compliant devices, WiFi devices, cellular devices, GPS devices, Ethernet ports, network ports, lightning cable ports, and/or other cable ports. In some examples, the communication circuitry 504 may be coupled to one or more antennas to facilitate wireless communication.

In some examples, the processing circuitry 506 may comprise one or more processors. In some examples, the processing circuitry 506 may comprise one or more drivers and/or internal clocks. In some examples, machine readable instructions stored in the memory circuitry 508 may implement one or more internal clocks. In some examples, the processing circuitry 506 may be configured to execute machine readable instructions stored in the memory circuitry 508.

In the example of FIG. 5, the memory circuitry 508 includes (and/or stores) a gift card management process 600 and the database 200. In some examples, the gift card management process 600 may comprise machine readable instructions configured for execution by the processing circuitry 506. In some examples, the gift card management process 600 may be implemented via discrete circuitry (e.g., of the processing circuitry 506) rather than, or in addition to, being part of (and/or stored in) the memory circuitry 508.

While illustrated as a single process (and a single database 200) in the example of FIG. 5 for the sake of clarity and simplicity, in some examples, portions of the gift card management process 600 (and/or database 200) may be implemented by several gift card management processes 600 (and/or databases 200) of several computing systems 500 operating in tandem. In some examples, one instance of the gift card management process 600 may execute for each gift card 300. In some examples, the different subsystems of the gift card management system 150 may be implemented (at least partially) via the gift card management process 600. In some examples, the different subsystems of the gift card management system 150 may (at least partially) comprise modules of the gift card management process 600.

Figure 6:
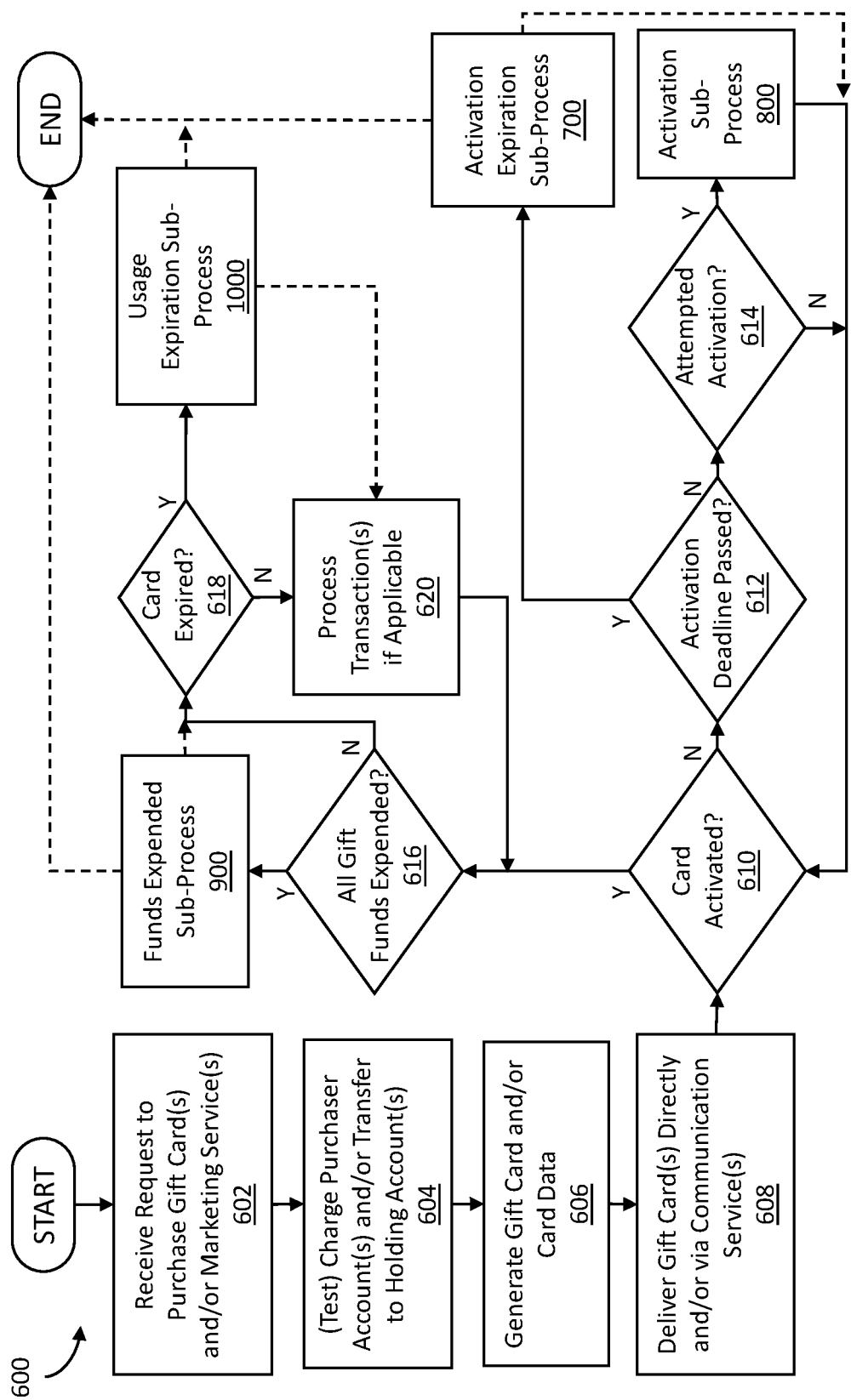
FIGS. 6-10 are flowcharts illustrating example operation of a gift card management process, in accordance with aspects of this disclosure.

FIG. 6 is a flow diagram illustrating an example operation of the gift card management process 600. In the example of FIG. 6, the gift card management process 600 begins at block 602 where the gift card management system 150 receives a purchase request from a purchaser 101. In some examples, the purchase request may be received electronically (e.g., over the internet), via telephone, or in person. In some examples, the purchase request may be a direct purchase of one or more gift cards 300, or a purchase of a marketing service, where gift cards 300 are employed to further the marketing service.

In the example of FIG. 6, the gift card management process 600 proceeds to block 604 after block 602. At block 604, the gift card management process 600 processes the payment for the purchase request from block 602, as previously described above. In some examples, this may entail transferring funds from the account(s) 108 of the purchaser 101 to the holding account(s) 108. In some examples, this may entail transferring funds from the account(s) 108 of the purchaser 101 to the account(s) 108 of the gift card management system 150. In some examples, this may entail a test charge/transfer that is immediately cancelled, refunded, and/or reversed once adequate funds are confirmed to be available. While not shown in the example of FIG. 6, the gift card management process 600 may end after block 604 if the payment processing fails.

In the example of FIG. 6, the gift card management process 600 proceeds to block 606 after block 604. At block 606, the gift card management process 600 generates card data for the gift card 300 and stores it in one or more databases 200, as previously described above. In some examples, an account 108 may be opened via a financial system 102 where the gift card 300 is an open loop gift card 300. In some examples, an entry in the card account table 202 of the database 200 made where the gift card 300 is a closed loop gift card 300. However, in some examples, account creation may be delayed until activation of the gift card 300. In some examples, delay of account creation until activation may save on used and/or required memory storage space, and/or processing time, as a non-trivial number of gift cards 300 are likely to never be activated.

In the example of FIG. 6, the gift card management process 600 proceeds to block 608 after block 606. At block 608, the gift card management process 600 delivers one or more gift cards 300 according to the purchase request at block 602, as described above. In some examples, this may be an in person delivery to the purchaser 101 who directly purchased the gift card(s) 300. In some examples, the delivery may be to a recipient 199 for whom the purchaser 101 has provided some information, and the gift card management process 600 may cooperate and/or communicate with a communication service 106 to perform the delivery. In some examples, the delivery may be to one or more recipient(s) 199 selected by the gift card management process 600 in order to fulfill a marketing service (e.g., generation of leads).

In the example of FIG. 6, the gift card management process 600 proceeds to block 610 after block 608. At block 610, the gift card management process 600 determines whether the gift card 300 has been activated (e.g., via a query of the database 200). As shown, the gift card management process 600 proceeds to block 612 after block 610 if the gift card 300 has not been activated. At block 612, the gift card management process 600 determines whether an activation deadline of the gift card 300 has passed (e.g., via a query of the database 200 and an evaluation of an internal clock).

In the example of FIG. 6, the gift card management process 600 proceeds to block 700 after block 612 if the gift card management process 600 determines that an activation deadline has passed. At block 700, the gift card management process 600 executes an activation expiration sub-process 700, which is discussed further below. In some examples, the gift card management process 600 may only execute the activation expiration sub-process 700 if the recipient 199 has attempted to use and/or activate the gift card 300 after the activation deadline has passed. After the activation expiration sub-process 700, the gift card management process 600 either ends or returns to block 610, as discussed further below.

In the example of FIG. 6, the gift card management process 600 proceeds to block 614 after block 612 if the gift card management process 600 determines that the activation deadline has not passed. At block 614, the gift card management process 600 determines whether there has been an attempted activation of the gift card 300. If there has been an attempted activation (e.g., an activation request received via one of the channels discussed above with respect to FIG. 4), the gift card management process 600 proceeds to block 800 where an activation sub-process 800 is executed, as discussed further below. As shown, the gift card management process 600 returns to block 610 if there has been no attempted activation and/or following the activation sub-process 800. In some examples, the gift card management process 600 may automatically reject any transaction request that is received during blocks 610, 612, 614, 700, and/or 800.

In the example of FIG. 6, the gift card management process 600 proceeds to block 616 after block 610 if the gift card management process 600 determines that the gift card 300 has been activated. At block 616, the gift card management process 600 determines whether all the funds associated with the gift card 300 have been used (e.g., via a query of the database 200 and/or communication with the appropriate financial system(s) 102 and/or merchant system(s) 104). As shown, if all the funds have been used, the gift card management process 600 executes a funds expended sub-process 900, as discussed further below, and then either proceeds to block 618 or ends, depending on the result of the funds expended process, as discussed further below.

In the example of FIG. 6, the gift card management process 600 also proceeds to block 618 after block 616 if all the funds have not been used. At block 618, the gift card management process 600 determines whether the gift card 300 has expired (e.g., via a query of the database 200 and an evaluation of an internal clock). As shown, if the gift card 300 has expired, the gift card management process 600 executes a usage expiration sub-process 1000, discussed further below. Following the usage expiration sub-process 1000, the gift card management process 600 either proceeds to block 620 or ends, depending on the result of the usage expiration sub-process 1000.

In the example of FIG. 6, the gift card management process 600 also proceeds to block 620 after block 618 if the gift card management process 600 determines that the gift card 300 has not expired. At block 620, the gift card management process 600 processes any attempted transaction using the gift card 300. In some examples, processing the transaction may entail receiving one or more signals from a POS system 120 of a merchant system 104 representative of the cost of the transaction and determining whether the gift card 300 has enough funds to cover the cost of the transaction. In some examples, the gift card management process 600 may inform the merchant system 104 whether the transaction can be approved or not based on its determination, and/or update the card account table 202 in the database 200 if the transaction is approved. In some examples, the gift card management process 600 may also store details of the transaction (e.g., what was purchased, the timing of the purchase, etc.) in the database(s) 200 for later use and/or analysis. As shown, the gift card management process 600 returns to block 616 after block 620.

In some examples where the gift card management process 600 is involved with processing transactions, the gift card management process 600 may automatically deny transactions outside of block 620. In some examples, this simple and easy transaction processing may be faster and/or result in fewer needed communications and/or database calls, taking up less bandwidth. In some examples (e.g., where the gift card 300 is an open loop gift card 300), the gift card management process 600 may not be involved in processing transactions.

Figure 7:
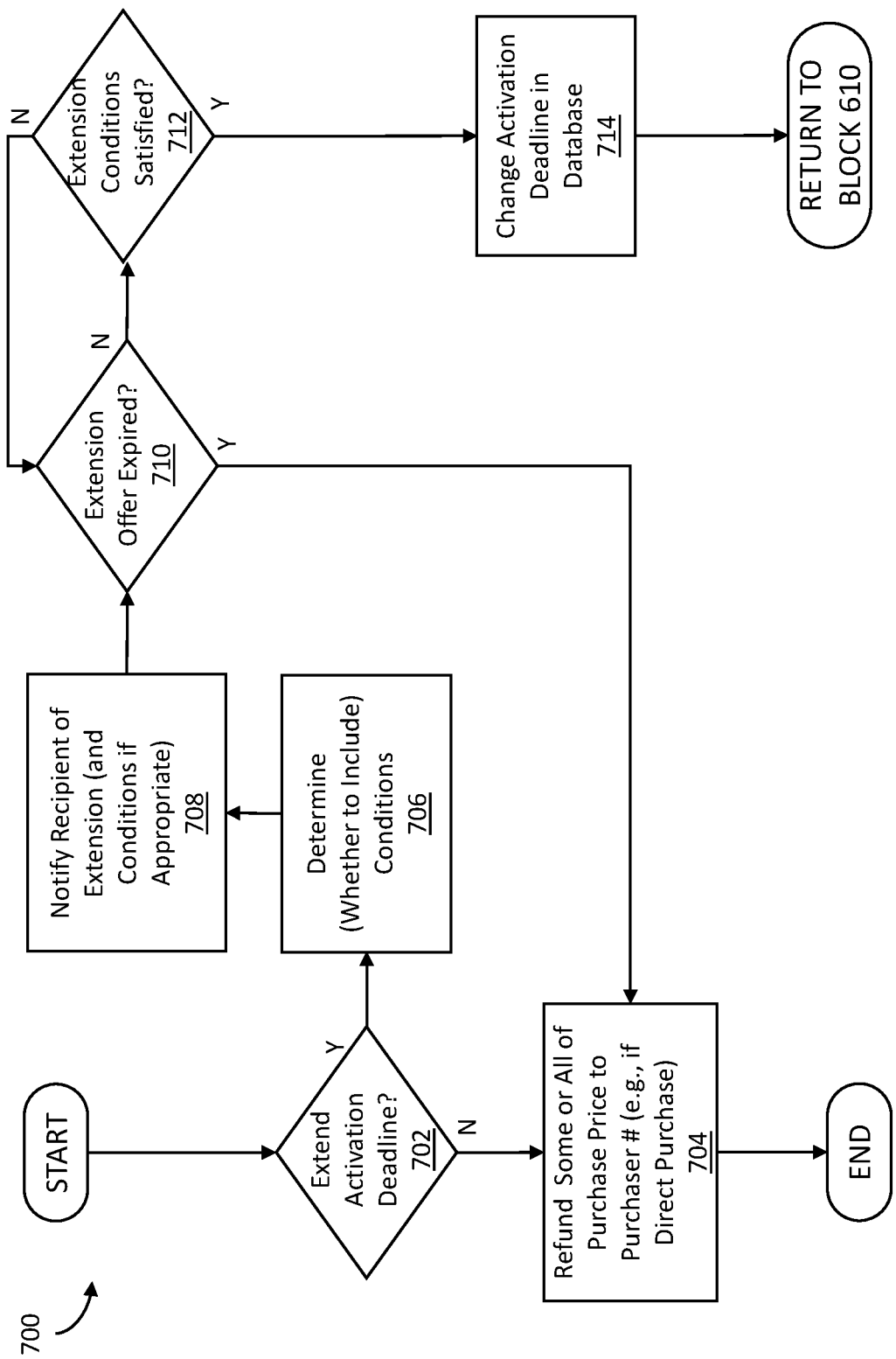

FIG. 7 is a flowchart showing an example operation of an activation expiration sub-process 700. In some examples, the activation expiration sub-process 700 may be a sub-process of the gift card management process 600. As shown, the activation expiration sub-process 700 begins at block 702, where the activation expiration sub-process 700 determines whether to offer an extension (and/or how long of an extension) of the activation deadline of the gift card 300. In some examples, this determination may be made based on a purchase price of the gift card 300, communications with the purchaser 101, one or more parameters of a campaign in which the gift card 300 was involved, whether the activation deadline has been previously extended, the intended recipient 199 of the gift card 300, whether an attempt was previously made to activate the gift card 300, and/or other pertinent factors.

In the example of FIG. 7, the activation expiration sub-process 700 proceeds to block 704 after block 702 if the activation expiration sub-process 700 determines not to offer to extend the activation deadline. At block 704, the activation expiration sub-process 700 refunds some or all of the purchase price of the gift card 300 to the purchaser 101 (e.g., from holding account(s) 108 and/or account(s) 108 of the gift card management system 150) if the purchaser 101 directly purchased the gift card 300. In some examples, the activation expiration sub-process 700 may additionally update the database(s) 200 to indicate the gift card 300 was not activated prior to the activation deadline. As shown, the activation expiration sub-process 700 (and/or the gift card management process 600) ends after block 704.

In the example of FIG. 7, the activation expiration sub-process 700 proceeds to block 706 after block 704 if the activation expiration sub-process 700 decides to offer an activation deadline extension. At block 706, the activation expiration sub-process 700 determines whether to make the offer conditional on completion of one or more additional activities, which additional activities, and/or how long a timeframe to allow the activities to be performed. In some examples, the additional activities may be similar to an activities required for activation (e.g., survey, interactive video, etc.). In some examples, the activation expiration sub-process 700 may additionally, or alternatively, determine whether to reduce (or increase) a potential starting balance of the gift card 300 if/when the activation deadline is extended. In some examples, the activation expiration sub-process 700 may additionally, or alternatively, determine whether to generate and/or deliver a new gift card 300 (e.g., with similar card data), in case the prior gift card 300 was lost. In some examples, the determination(s) at block 706 may be based on a purchase price of the gift card 300, communications with the purchaser 101, one or more parameters of a campaign in which the gift card 300 was involved, whether the activation deadline has been previously extended, the intended recipient 199 of the gift card 300, whether an attempt was previously made to activate the gift card 300, and/or other pertinent factors.

In the example of FIG. 7, the activation expiration sub-process 700 proceeds to block 708 after block 706. At block 708, the activation expiration sub-process 700 attempts to notify the recipient 199 (and/or purchaser 101 in some examples) that the activation deadline has been extended. In some examples, the activation expiration sub-process 700 may use contact information for the recipient 199 (e.g., stored in the database(s) 200) and/or one or more communication services 106 to perform the notification. In some examples, the activation expiration sub-process 700 may additionally provide a notification of any conditions upon which the extension may be dependent, a timeframe by which to meet the conditions, any modification to the balance, any reissuance of the gift card 300, and/or other pertinent information.

In the example of FIG. 7, the activation expiration sub-process 700 proceeds to block 710 after block 708. At block 710, the activation expiration sub-process 700 determines whether the timeframe for meeting the conditions has expired. In some examples, this may be an automatic no if there are no conditions. If the timeframe for meeting the conditions has expired, the activation expiration sub-process 700 proceeds to block 704.

In the example of FIG. 7, the activation expiration sub-process 700 proceeds to block 712 after block 710 if the timeframe for meeting the conditions has not expired. At block 712, the activation expiration sub-process 700 determines whether the conditions for the activation extension have been met. In some examples, this may be an automatic yes if there are no conditions. As shown, the activation expiration sub-process 700 proceeds to block 714 if the conditions have been met, and returns to block 710 if not. At block 714, the activation expiration sub-process 700 changes the activation deadline in the database(s) 200 and then returns to block 610 of the gift card management process 600.

Figure 8:
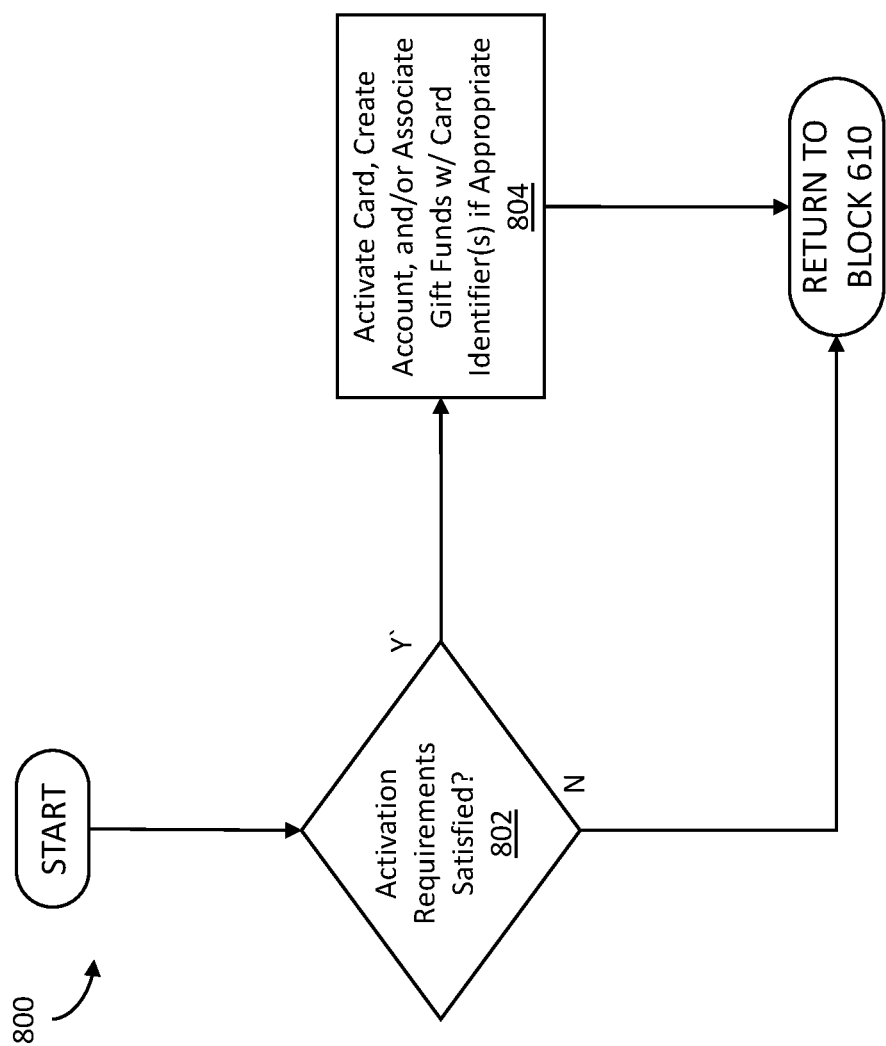

FIG. 8 is a flowchart showing an example operation of an activation sub-process 800. In some examples, the activation sub-process 800 may be a sub-process of the gift card management process 600. As shown, the activation sub-process 800 begins at block 802, where the activation sub-process 800 determines whether the activation requirements have been met. In some examples, this determination may entail querying the database(s) 200 to gather the activation requirements, and evaluating the attempted activation to determine whether those requirements have been met. As shown, the activation sub-process 800 returns to block 610 of the gift card management process 600 if the requirements were not met.

In the example of FIG. 8, the activation sub-process 800 proceeds to block 804 after block 802 if the activation requirements were met. At block 804, the activation sub-process 800 updates the database to indicate that the gift card 300 has been activated. In some examples, the activation sub-process 800 may additionally update the database(s) 200 to create an account for the gift card 300 (e.g., where the gift card 300 is closed loop). In some examples, the activation sub-process 800 may additionally communicate with the financial system(s) 102 to create an account for the gift card 300 (e.g., where the gift card 300 is open loop). In some examples, the activation sub-process 800 may additionally communicate with the merchant system(s) 104 and/or financial system(s) 102 to indicate that the gift card 300 has been activated. In some examples, the activation sub-process 800 may additionally cooperate and/or communicate with the financial system(s) 102 to transfer money from the account(s) 108 of the purchaser 101 and/or the holding account(s) 108 to the account(s) 108 of the gift card 300 and/or the account(s) 108 of the gift card management system 150. As shown, the activation sub-process 800 returns to block 610 of the gift card management process 600) after block 804.

Figure 9:
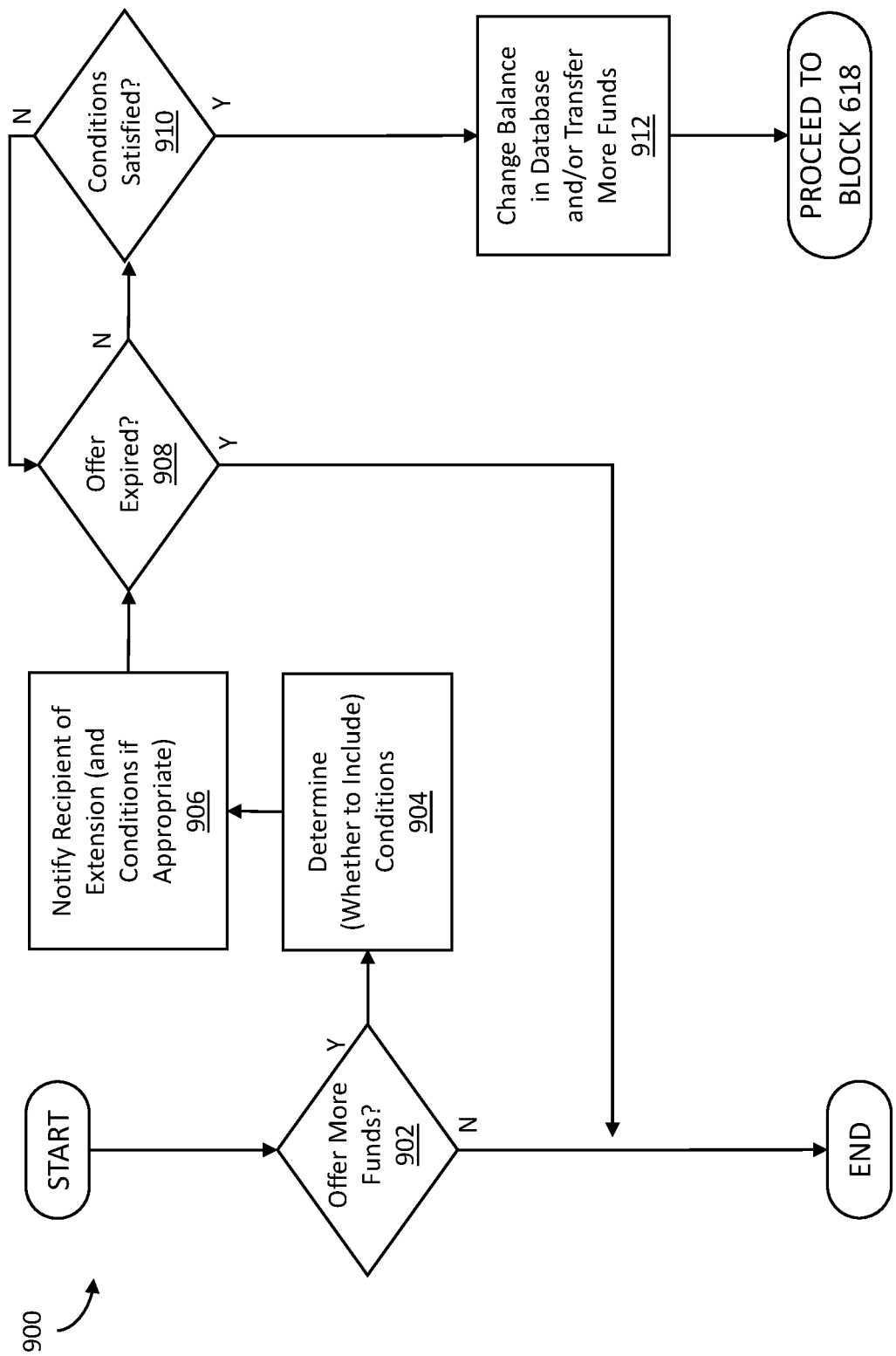

FIG. 9 is a flowchart showing an example operation of a funds expended sub-process 900. In some examples, the funds expended sub-process 900 may be a sub-process of the gift card management process 600. As shown, the funds expended sub-process 900 begins at block 902, where the funds expended sub-process 900 determines whether to offer more funds to the recipient 199 for the gift card 300. In some examples, the funds expended sub-process 900 may additionally determine an amount of additional funds that should be offered. In some examples, the determination(s) may be based on a purchase price of the gift card 300, communications with the purchaser 101 and/or the merchant system(s) 104, one or more parameters of a campaign in which the gift card 300 is involved, whether funds were previously added, the intended recipient 199 of the gift card 300, a temporal proximity of the expiration date and/or activation date, and/or other pertinent factors. As shown, the funds expended sub-process 900 ends after block 902 if the funds expended sub-process 900 determines not to offer more funds.

In the example of FIG. 9, the funds expended sub-process 900 proceeds to block 904 after block 902 if the funds expended sub-process 900 determines to offer more funds. At block 904, the funds expended sub-process 900 determines whether to make the offer conditional on completion of one or more additional activities, which additional activities, and/or how long a timeframe to allow the activities to be performed. In some examples, the additional activities may be similar to an activities required for activation (e.g., survey, interactive video, etc.). In some examples, the determination(s) may be based on a purchase price of the gift card 300, communications with the purchaser 101 and/or the merchant system(s) 104, one or more parameters of a campaign in which the gift card 300 is involved, whether funds were previously added, the intended recipient 199 of the gift card 300, a temporal proximity of the expiration date and/or activation date, and/or other pertinent factors.

In the example of FIG. 9, the funds expended sub-process 900 proceeds to block 906 after block 904. At block 906, the funds expended sub-process 900 attempts to notify the recipient 199 (and/or purchaser 101 in some examples) that more funds may be offered. In some examples, the funds expended sub-process 900 may use contact information for the recipient 199 (e.g., stored in the database(s) 200) and/or one or more communication services 106 to perform the notification. In some examples, the funds expended sub-process 900 may additionally provide a notification of the amount of additional funds offered, any conditions upon which the offer may be dependent, a timeframe by which to meet the conditions of the offer, and/or other pertinent information.

In the example of FIG. 9, the funds expended sub-process 900 proceeds to block 908 after block 906. At block 908, the funds expended sub-process 900 determines whether the timeframe for meeting the conditions has expired. In some examples, this may be an automatic no if there are no conditions. If the timeframe for meeting the conditions has expired, the funds expended sub-process 900 ends.

In the example of FIG. 9, the funds expended sub-process 900 proceeds to block 910 after block 908 if the timeframe for meeting the conditions has not expired. At block 910, the funds expended sub-process 900 determines whether the conditions for the additional funds have been met. In some examples, this may be an automatic yes if there are no conditions. As shown, the funds expended sub-process 900 proceeds to block 912 if the conditions have been met, and returns to block 908 if not. At block 912, the funds expended sub-process 900 changes the balance of the gift card 300 in the database(s) 200 (and/or via the financial system(s) 102) and then returns to block 618 of the gift card management process 600.

Figure 10:
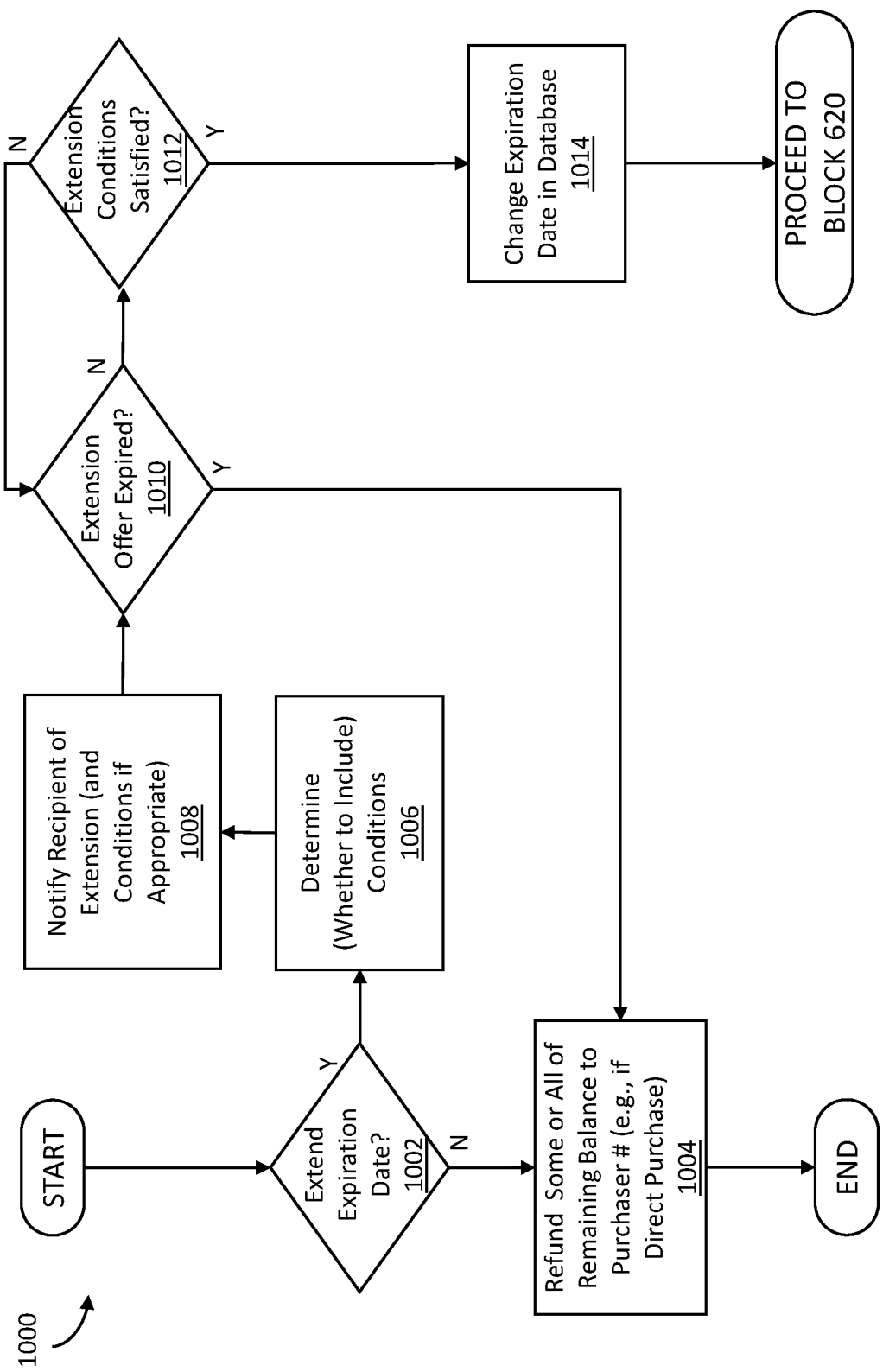

FIG. 10 is a flowchart showing an example operation of a usage expiration sub-process 1000. In some examples, the usage expiration sub-process 1000 may be a sub-process of the gift card management process 600. As shown, the usage expiration sub-process 1000 begins at block 1002, where the usage expiration sub-process 1000 determines whether (and/or how long) to offer to extend the expiration date of the gift card 300. In some examples, this determination may be made based on a purchase price of the gift card 300, communications with the purchaser 101, one or more parameters of a campaign in which the gift card 300 is involved, whether the expiration date (and/or activation date) has been previously extended, the temporal proximity of the activation date (and/or prior expiration date(s) and/or activation date(s)), the intended recipient 199 of the gift card 300, whether more funds were added to the gift card 300, whether the conditions for more funds were previously met, and/or other pertinent factors.

In the example of FIG. 10, the usage expiration sub-process 1000 proceeds to block 1004 after block 1002 if the usage expiration sub-process 1000 determines not to offer to extend the expiration date. At block 1004, the usage expiration sub-process 1000 refunds some or all of the remaining balance of gift card 300 to the purchaser 101 if the purchaser 101 directly purchased the gift card 300. In some examples, the usage expiration sub-process 1000 may additionally update the database(s) 200 to indicate the gift card 300 has expired. As shown, the usage expiration sub-process 1000 (and/or the gift card management process 600) ends after block 1004.

In the example of FIG. 10, the usage expiration sub-process 1000 proceeds to block 1006 after block 1002 if the usage expiration sub-process 1000 determines to offer to extend the expiration date. At block 1006, the usage expiration sub-process 1000 determines whether to make the offer to extend conditional on completion of one or more additional activities, which additional activities, and/or how long a timeframe to allow the activities to be performed. In some examples, the additional activities may be similar to activities required for activation. In some examples, the usage expiration sub-process 1000 may additionally, or alternatively, determine whether to reduce (or increase) the balance of the gift card 300 if/when the expiration date is extended. In some examples, the usage expiration sub-process 1000 may additionally, or alternatively, determine whether to generate and/or deliver a new gift card 300 (e.g., with similar card data), in case the prior gift card 300 was lost. In some examples, the determination(s) at block 1006 may be based on a purchase price of the gift card 300, communications with the purchaser 101, one or more parameters of a campaign in which the gift card 300 is involved, whether the expiration date (and/or activation date) has been previously extended, the temporal proximity of the activation date (and/or prior expiration date(s) and/or activation date(s)), the intended recipient 199 of the gift card 300, whether more funds were added to the gift card 300, whether the conditions for more funds were previously met, and/or other pertinent factors.

In the example of FIG. 10, the usage expiration sub-process 1000 proceeds to block 1008 after block 1006. At block 1008, the usage expiration sub-process 1000 attempts to notify the recipient 199 (and/or purchaser 101 in some examples) that the expiration date has been extended. In some examples, the usage expiration sub-process 1000 may use contact information for the recipient 199 (e.g., stored in the database(s) 200) and/or one or more communication services 106 to perform the notification. In some examples, the usage expiration sub-process 1000 may additionally provide a notification of any conditions upon which the extension may be dependent, a timeframe by which to meet the conditions, any modification to the balance, any reissuance of the gift card 300, and/or other pertinent information.

In the example of FIG. 10, the usage expiration sub-process 1000 proceeds to block 1010 after block 1008. At block 1010, the usage expiration sub-process 1000 determines whether the timeframe for meeting the extension conditions has expired. In some examples, this may be an automatic no if there are no conditions. If the timeframe for meeting the conditions has expired, the usage expiration sub-process 1000 proceeds to block 1004.

In the example of FIG. 10, the usage expiration sub-process 1000 proceeds to block 1012 after block 1010 if the timeframe for meeting the conditions has not expired. At block 1012, the usage expiration sub-process 1000 determines whether the conditions for the expiration date extension have been met. In some examples, this may be an automatic yes if there are no conditions. As shown, the usage expiration sub-process 1000 proceeds to block 1014 if the conditions have been met, and returns to block 1010 if not. At block 1014 where the usage expiration sub-process 1000 changes the expiration date in the database(s) 200 and returns to block 620 of the gift card management process 600.

The disclosed gift card management system 150 provides gift cards 300 that must be activated (e.g., via a non-purchasing process) prior to being used to make a purchase. In some examples, an attempt to use the gift card 300 to make a purchase prior to activation may be automatically refused. In some examples, this simplistic transaction processing prior to activation may lessen the required and/or used processing time, calls to the database(s) 200, and/or communication bandwidth that might otherwise be used (especially for closed loop gift cards 300) to attempt to process the transaction. In some examples, an account 108 (and/or card account database 200 entry) for the gift card 300 may only be generated after activation, which may result in less required and/or used memory storage space.

In some examples, the process used for activation may acquire characteristics of the recipient 199 that may be useful in marketing and/or other activities. In some examples, this may eliminate the need for the recipient 199 to create an account and/or enter what might be perceived as personal information, which may reduce the chances that the recipient 199 will use the gift card 300 when required. In some examples, the acquired characteristics may also take up less space than a full account profile, especially since the characteristics are only acquired at activation, and some non-trivial number of gift cards 300 are likely never to be activated.

In some examples, the activation may additionally include certain safeguards to prevent fraud. In some examples, a purchaser 101 may be refunded some or all of a purchase price for the gift card 300 when the gift card 300 is not activated prior to the activation deadline. Separate activation and expiration deadlines may also help to work around certain legislation that prohibits (and/or imposes stringent requirements upon) expiration dates for gift cards 300.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein, the terms "e.g.," and "for example" set off lists of one or more non-limiting examples, instances, or illustrations.

As used herein, a "gift card" refers to a physical and/or electronic object associated with a certain amount of currency, funds, and/or monetary value that can be purchased by one party and provided to another, typically as a present, bonus, and/or award.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

As used herein, disable may mean deactivate, incapacitate, and/or make inoperative. As used herein, enable may mean activate and/or make operational.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. A system for conditionally gifting funds, comprising:
a gift card database that associates a card identifier with an activation deadline and one or more activation requirements of a non-purchasing activation process, the one or more activation requirements comprising one or more non-purchasing activities that must be performed, or one or more non-purchasing requirements that must be met, by the activation deadline in order to successfully activate a gift card;
a computing system comprising:
processing circuitry; and
memory circuitry comprising machine readable instructions which, when executed by the processing circuitry, cause the processing circuitry to:

reject any transaction request that is received prior to activation of the gift card, receive one or more signals representative of an attempted activation of the gift card, the gift card being associated with the card identifier, determine whether the attempted activation satisfies the one or more activation requirements, determine whether the attempted activation occurred prior to the activation deadline, activate the gift card in response to determining the attempted activation comprises the non-purchasing activation process, satisfies the one or more activation requirements, and occurred prior to the activation deadline, and initiate a transfer of funds from a first account to a second account in response to activating the gift card.

2. The system of claim 1, wherein the computing system further comprises communication circuitry in communication with an electronic or radio frequency (RF) communication network.

3. The system of claim 2, wherein activating the gift card or transferring funds comprises communicating with a financial system over the electronic or RF communication network via the communication circuitry.

4. The system of claim 3, wherein the transfer of funds comprises a second transfer of funds, and the memory circuitry comprises machine readable instructions which, when executed by the processing circuitry, further cause the processing circuitry to:

initiate a first transfer of funds from a third account to the first account in response to a purchase of the gift card via communication with the banking system via the communication circuitry, and return the funds to the third account in response to determining the activation deadline has passed, wherein the third account is associated with a purchaser of the gift card, and the first account is a holding account.

5. The system of claim 1, wherein activating the gift card comprises collecting of one or more personal characteristics of a recipient of the gift card without requiring creation of an account.

6. The system of claim 5, wherein the one or more personal characteristics comprise a favorite color, a favorite media, a favorite food, a favorite drink, a needed service, a perception of a brand, a recently used brand, or a recently used service.

7. The system of claim 1, wherein the gift card database further stores a usage period associated with the card identifier, the memory circuitry comprising machine readable instructions which, when executed by the processing circuitry, cause the processing circuitry to:

in response to activating the gift card:
create a card account entry in the gift card database, the card account entry being associated with a balance of the gift card and the card identifier in the gift card database, determine an expiration date based on the usage period and an activation date when the gift card was activated, and store the expiration date in the gift card database, the expiration date being associated with the card identifier in the gift card database.

8. The system of claim 1, wherein the memory circuitry comprises machine readable instructions which, when executed by the processing circuitry, further case the processing circuitry to:

in response to determining the activation deadline has passed:
determine whether to offer an extension of the activation deadline based on a purchase price of the gift card, whether the extension was previously offered, or whether activation was previously attempted, and in response to determining to offer the extension, identify a change in a starting balance of the gift card or one or more additional activation requirements.

9. The system of claim 1, wherein the computing system further comprises communication circuitry, and the memory circuitry comprises machine readable instructions which, when executed by the processing circuitry, further case the processing circuitry to:

transmit, via the communication circuitry, a first signal in response to determining that the activation deadline has passed, the first signal being indicative of an offer to extend the activation deadline; and extend the activation deadline in response to receiving, via the communication circuitry, a second signal indicating acceptance of the offer.

10. The system of claim 9, wherein the offer is contingent upon successful completion of an activity.

11. A method of conditionally gifting funds, comprising:
providing a gift card database that associates a card identifier with an activation deadline and one or more activation requirements of a non-purchasing activation process, the one or more activation requirements comprising one or more non-purchasing activities that must be performed, or one or more non-purchasing requirements that must be met, by the activation deadline in order to successfully activate a gift card;

rejecting, by processing circuitry of a computing system, any transaction request that is received at the computing system prior to activation of the gift card;

receiving, by the processing circuitry, one or more signals representative of an attempted activation of the gift card, the gift card being associated with the card identifier;

determining, by the processing circuitry, whether the attempted activation satisfies the one or more activation requirements;

determining, by the processing circuitry, whether the attempted activation occurred prior to the activation deadline;

activating the gift card, by the processing circuitry, in response to determining the attempted activation comprises the non-purchasing activation process, satisfies the one or more activation requirements, and occurred prior to the activation deadline; and initiating a transfer of funds, by the processing circuitry, from a first account to a second account in response to activating the gift card.

12. The method of claim 11, wherein the computing system comprises communication circuitry in communication with an electronic or radio frequency (RF) communication network.

13. The method of claim 12, wherein activating the gift card or transferring funds comprises communicating with a financial system over the electronic or RF communication network via the communication circuitry.

14. The method of claim 13, wherein the transfer of funds comprises a second transfer of funds, and the method further comprises:
- initiating a first transfer of funds from a third account to the first account in response to a purchase of the gift card by communication with the banking system via the communication circuitry, and
- returning the funds to the third account, by communication with the banking system via the communication circuitry, in response to determining the activation deadline has passed, wherein the third account is associated with a purchaser of the gift card, and the first account is a holding account.

15. The method of claim 11, wherein activating the gift card comprises collecting of one or more personal characteristics of a recipient of the gift card without requiring creation of an account.

16. The method of claim 15, wherein the one or more personal characteristics comprise a favorite color, a favorite media, a favorite food, a favorite drink, a needed service, a perception of a brand, a recently used brand, or a recently used service.

17. The method of claim 11, wherein the gift card database further stores a usage period associated with the card identifier, the method further comprising:
- in response to activating the gift card:
  - creating, by the processing circuitry, a card account entry in the gift card database, the card account entry being associated with a balance of the gift card and the card identifier in the gift card database,
  - determining, by the processing circuitry, an expiration date based on the usage period and an activation date when the gift card was activated, and
  - storing, by the processing circuitry, the expiration date in the gift card database, the expiration date being associated with the card identifier in the gift card database.

18. The method of claim 11, further comprising:
- in response to determining the activation deadline has passed:
  - determining, by the processing circuitry, whether to offer an extension of the activation deadline based on a purchase price of the gift card, whether the extension was previously offered, or whether activation was previously attempted, and
  - in response to determining to offer the extension, identify, by the processing circuitry, a change in a starting balance of the gift card or one or more additional activation requirements.

19. The method of claim 11, further comprising:
- transmitting, by the processing circuitry and via communication circuitry of the computing system, a first signal in response to determining that the activation deadline has passed, the first signal being indicative of an offer to extend the activation deadline; and
- extending, by the processing circuitry, the activation deadline in response to receiving, via the communication circuitry, a second signal indicating acceptance of the offer.

20. The method of claim 19, wherein the offer is contingent upon successful completion of an activity.

* * * * *